United States Patent [19]

Krummheuer et al.

[11] Patent Number: 5,477,890
[45] Date of Patent: Dec. 26, 1995

[54] INTEGRATED WEAVING AND WET TREATMENT METHOD FOR MANUFACTURING UNCOATED INDUSTRIAL WOVEN FABRICS

[75] Inventors: Wolf R. Krummheuer, Wuppertal; Volker Siejak, Duisberg; Hans A. Graefe, Schwelm, all of Germany

[73] Assignee: Akzo Nobel NV, Arnhem, Netherlands

[21] Appl. No.: 281,577

[22] Filed: Jul. 28, 1994

[30] Foreign Application Priority Data

Jul. 31, 1993 [DE] Germany .......................... 43 25 777.1
Jun. 8, 1994 [DE] Germany .......................... 44 20 000.5

[51] Int. Cl.$^6$ ..................... D03D 1/02; D03J 1/06
[52] U.S. Cl. ............... 139/291 R; 8/151; 28/167; 428/36.1; 139/389; 26/18.5
[58] Field of Search ................... 139/1 R, 389, 139/291 R; 8/151; 28/167; 280/728 R; 428/36.1; 26/18.5

[56] References Cited

U.S. PATENT DOCUMENTS

| | | | |
|---|---|---|---|
| 2,276,605 | 3/1942 | Andrews | 68/22 |
| 3,861,062 | 1/1975 | Wymann . | |
| 4,840,397 | 6/1989 | Katz et al. | 280/739 |
| 4,921,735 | 5/1990 | Bloch . | |
| 4,952,145 | 8/1990 | Kwiatkowski et al. | |
| 5,010,663 | 4/1991 | Thornton et al. | 280/728 R X |
| 5,068,000 | 11/1991 | Lauderdale | 26/51.3 |
| 5,093,163 | 3/1992 | Krummheuer et al. | 280/741 |
| 5,356,680 | 10/1994 | Krummheuer et al. | 28/167 X |

FOREIGN PATENT DOCUMENTS

| | | |
|---|---|---|
| 240807 | 6/1965 | Austria . |
| 2034067 | 7/1991 | Canada . |
| 2073957 | 1/1993 | Canada . |
| 314867 | 5/1989 | European Pat. Off. . |
| 336507 | 10/1989 | European Pat. Off. . |
| 436950 | 7/1991 | European Pat. Off. . |
| 453678 | 10/1991 | European Pat. Off. . |
| 523546 | 1/1993 | European Pat. Off. . |
| 1535494 | 4/1970 | Germany . |
| 2540939 | 3/1977 | Germany . |
| 2849596 | 5/1980 | Germany . |
| 914907 | 6/1980 | U.S.S.R. . |
| 2031032 | 4/1980 | United Kingdom . |

*Primary Examiner*—Andy Falik
*Attorney, Agent, or Firm*—Oliff & Berridge

[57] ABSTRACT

In a method of manufacturing uncoated industrial woven fabrics having specifically adjusted air permeability from synthetic fibers, after the synthetic fibers have been woven into a fabric the fabric is passed through an aqueous bath having a temperature of approximately 20°–100° C., then is passed through a drying zone. The woven fabric is allowed to shrink in the aqueous bath and in the subsequent drying zone to produce a woven fabric having a specific air permeability. The method is especially suitable for the manufacture of fabric used in air bags.

25 Claims, 4 Drawing Sheets

INTEGRATED WEAVING AND WET TREATMENT METHOD FOR MANUFACTURING UNCOATED INDUSTRIAL WOVEN FABRICS

BACKGROUND

The invention relates to a method for manufacturing uncoated industrial woven fabrics with specifically adjusted air permeability from synthetic filament yarns.

Uncoated industrial woven fabrics with specifically adjusted air permeability are highly important in some application fields. Low air permeability is required for sail and parachute fabrics and for fabrics used for the contact portion of air bags.

Air bags are frequently made from two fabric portions having differing air permeability. For the contact portion of the air bar, which faces the vehicle occupant when the air bag is released and against which gas entering the air bag flows, a very low air permeability of less than 10 $l/dm^2.min$ (measured at 500 Pa test differential pressure) is required. To allow soft cushioning of the vehicle occupant during a vehicle collision, however, a portion of the gas which inflates the air bag must be able to escape when the air bag contacts the vehicle occupant. For this reason, the air bag has a second fabric portion with higher air permeability than the contact portion of the air bag. The second fabric portion is normally designated as the filter portion. In addition to allowing gas to escape from the air bag, this fabric portion also has the task of intercepting particles in the gas used to inflate the air bag, which to some extent are very hot. The air permeability values for the filter portion of the air bag are typically between 20 and 120 $l/dm^2.min$ (measured at 500 Pa test differential pressure), depending on the type of vehicle. The manufacturing conditions for fabrics requiring both high and low air permeability must be precisely matched to the required air permeability.

Uncoated industrial woven fabrics with specifically adjusted air permeability are of great importance for air bags, gas filtration, manufacturing jump cushions, and other applications.

An air bag may be woven in one piece, with regions of differing air permeability created by varying the fabric density on a power loom, or two different fabrics having differing air permeability values may be sewn together to create the air bag.

Coated woven fabrics are employed for the contact portion of air bags and for other applications of industrial woven fabrics where low air permeability is required. In addition to the high manufacturing costs, these fabrics have additional disadvantages, and this is particularly true for the air bag. For this reason, methods have been developed for manufacturing uncoated woven fabrics with either low or specifically adjusted air permeability. Easily conductible wet processes, with appropriate drying conditions are described in EP-A 436 950 and EP-A 523 546. By means of specifically initiating shrinkage in these cases, fabric compaction is achieved in an easily influenced and controllable manner. Another approach to manufacturing uncoated industrial woven fabrics with low air permeability uses calendaring methods as described in EP-A 314 867 and EP-A 453 678.

Despite the relatively low manufacturing costs for uncoated industrial woven fabrics having low or specifically adjusted air permeability, there is still a need to reduce the manufacturing costs of these fabrics even further and to develop an even more cost effective method.

Surprisingly, it has now been found that it is possible to integrate the wet process for shrinkage initiation into the weaving process. Previously, the wet process for shrinkage initiation was conducted discontinuously with the weaving process. The continuous process of weaving and shrinkage initiation allows a further significant reduction in the costs of manufacturing uncoated industrial woven fabrics with specifically adjusted air permeability values.

Methods for incorporating a wet process into the weaving process have been disclosed. In DE-A 2,849,596, a "shrinkage bath" is mentioned, although the meaning of this term is not explained. As indicated in FIG. 6 and FIG. 7 of the cited patent publication, this bath is situated downstream from a drying zone. The bath is obviously intended for applying a finish to the fabric. Due to the wet zone's location downstream from the dryer, this method is not suitable for manufacturing industrial woven fabrics with specifically adjusted air permeability. Moreover, this document provides no information concerning the process parameters to be used for industrial woven fabrics of this type.

A similar process is described in AT-B 240 807. In this reference, according to FIG. 3, the industrial fabric is passed through a liquid bath after leaving the weaving zone, and a liquid metal bath is preferred. In this method, shrinkage initiation is not evident from either the description or the drawings. A drying apparatus is also not provided. This document contains no information about parameters for manufacturing industrial woven fabric with specifically adjusted air permeability.

SUMMARY OF THE INVENTION

The present invention is a method of initiating a specific amount of shrinkage in an industrial woven fabric. According to the present invention, a vat is installed after a power loom, and a fabric woven on the power loom is passed through an aqueous medium in the vat immediately after leaving the power loom. After leaving the aqueous medium in the vat the fabric is subsequently dried. This treatment leads to fabric compaction, and in turn to a reduction in air permeability. The extent of fabric compaction depends very heavily on the shrinkage characteristics of the yarns used for the fabric manufacture and on the established process parameters.

The method according to the present invention can be employed on any power loom so long as there is room to install a wet treatment zone. For example a gripper loom can be converted such that an emersion vat and a subsequent drying zone is installed in the rear part of the power loom as viewed in the direction of production.

When using water jet looms, it has been noted that for fabrics containing yarns with a high capacity for shrinkage, partial shrinkage initiation can occur in the weaving zone itself. This must be taken into account when the process conditions are to be transferred from an integrated process with a gripper loom to an integrated process with a water jet loom.

BRIEF DESCRIPTION OF THE DRAWINGS

The invention will be described in detail with reference to the following figures wherein like elements bear like reference numerals and wherein.

DETAILED DESCRIPTION OF PREFERRED EMBODIMENTS

Figure 1:
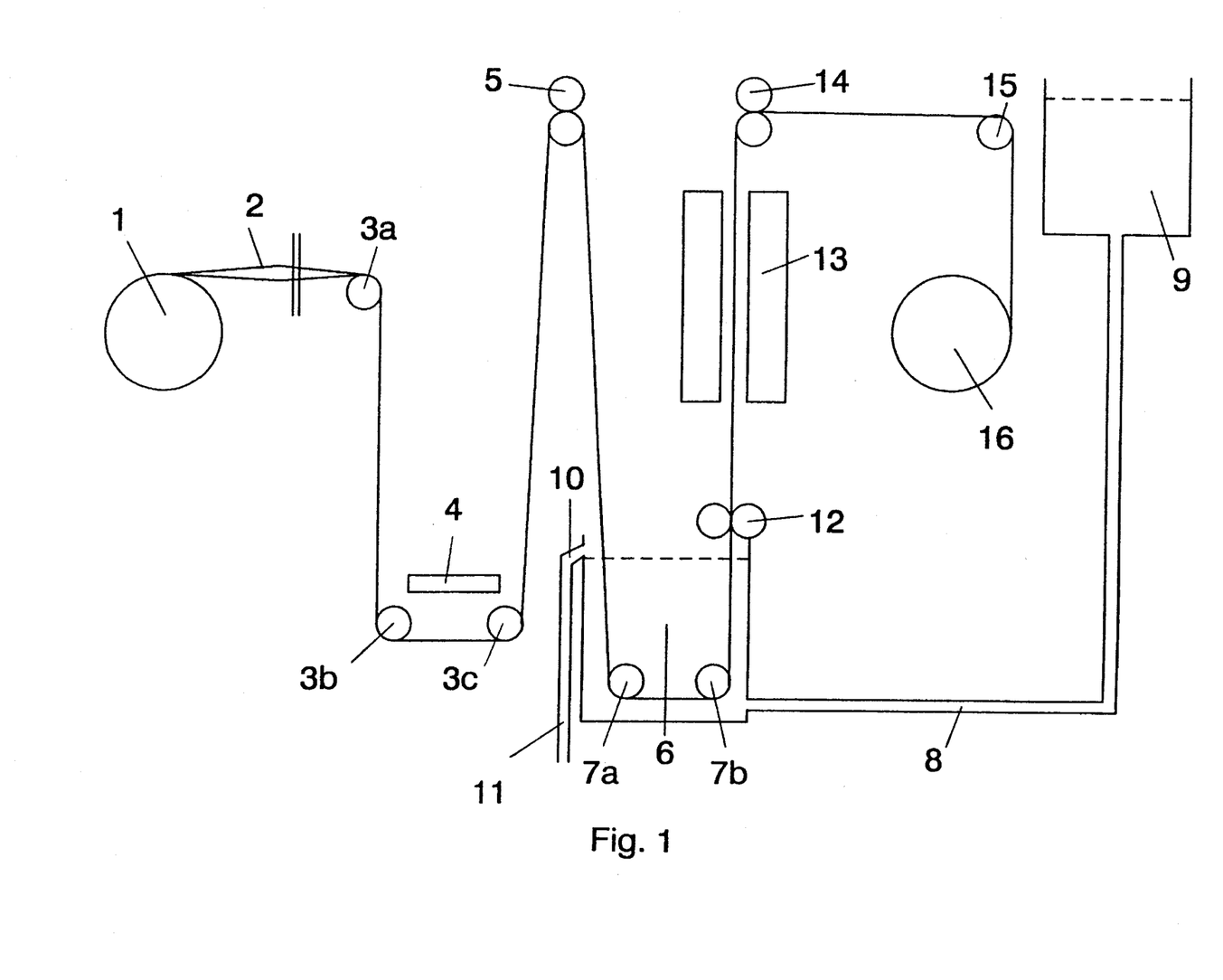
FIG. 1 is a diagram of a weaving and shrinkage initiation apparatus according to the present invention.

FIG. 1 shows an apparatus according to the present invention that includes a finishing zone for shrinking the fabric, integrated into the weaving process. From warp beam 1, the warp to be interwoven is fed to the actual weaving zone 2, where weft insertion takes place. The fabric produced on the power loom travels around beam 3a, which designates the conventional loom apparatus needed to maintain tension during weaving, then via drive and deflection rollers 3b and 3c, the fabric travels below an observation point 4 for the operating personnel. The fabric then travels to drive roller pair 5, which withdraws the fabric from the power loom.

The fabric is next fed into treatment vat 6 that contains a treatment bath. The guide rollers 7a and 7b in treatment vat 6 implement the immersion section for the fabric. Fresh fluid for the treatment bath is provided by supply line 8 from reservoir 9. Used and contaminated bath fluid is removed from the vat 6 by line 11 via overflow channel 10. Roller pair 12 located at the exit from the vat 6 squeezes out excess bath fluid. After the treatment in vat 6, the fabric is fed to drying zone 13, where it is dried. Drive roller pair 14 at the exit from drying zone 13 feeds the fabric. The fabric is fed via deflection roller 15 to cloth beam 16, where it is wound up.

The process outlined in FIG. 1 is intended as an example only and is not to be viewed as restrictive. Other process sequences are possible. For example, a treatment bath can be located immediately after the cloth beam 16.

Vat 6, installed after the actual weaving zone 2, contains bath fluid such as water that possibly includes a surface-active agent. Such surface-active agents serve to better wash out any finishing agent remaining on the yarn from the manufacturing process. The type and concentration of surface-active agent that may be used are known to those skilled in the textile art.

Bath fluid is replenished in treatment vat 6 from reservoir 9. This reservoir 9 may serve only one installation, or if several installations are operated in close proximity the reservoir could serve as a central reservoir for all installations. Such central supply stations are known, especially in the textile finishing industry.

The temperature of the treatment bath may be between 20° and 100° C. Temperature ranges between 60° and 95° C. are preferred, and a range between 90° and 95° C. is especially preferred. The amount of shrinkage initiation depends on the treatment temperature. Shrinkage is more pronounced at higher temperatures than at lower temperatures.

Figure 2:
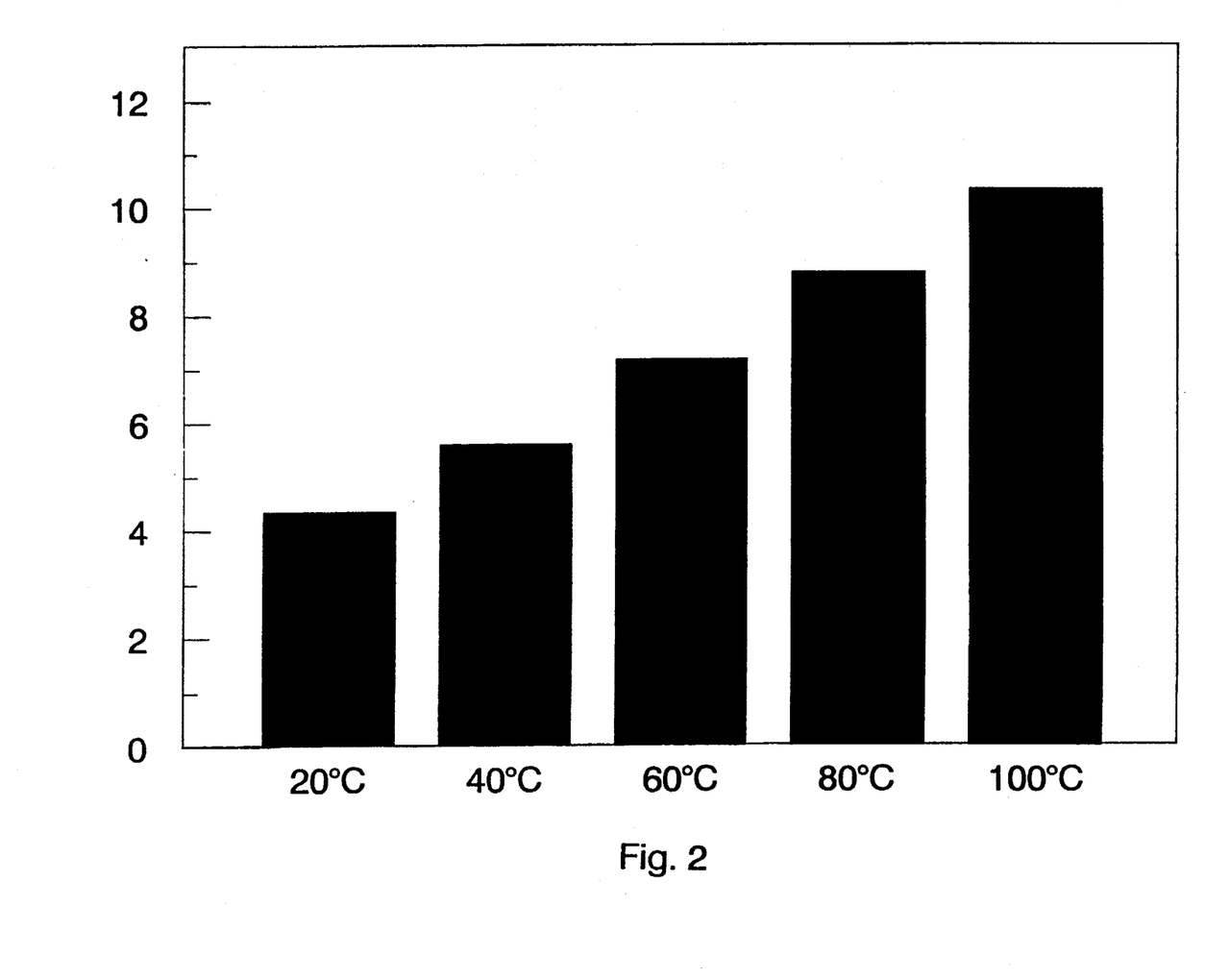
FIG. 2 is a chart showing the percentage of shrinkage induced in a woven fabric at different temperature conditions.

FIG. 2 shows the relationship between the shrinkage initiated in the treatment bath and the bath temperature. The x-axis represents the treatment temperature of the treatment bath in intervals of 20° C. The y-axis represents the percentage of shrinkage initiation achieved. The percentages given here are changes in fabric length with respect to the starting length. For this series of tests, the hot-air shrinkage of the yarns employed for fabric manufacture was 9.5% (measured at 190° C).

Surprisingly, it was noted that shrinkage occurs even at relatively low bath temperatures below 60° C. For manufacturing fabrics with very low air permeability, such as is required for air bag contact fabrics, the amount of shrinkage achieved below 60° C. is not sufficient. In this case, higher treatment temperatures are required. In order to attain the desired fabric compaction and thus the desired low air permeability, it is preferable to use a treatment bath having a temperature range of 90°–95° C. At these temperatures, the desired shrinkage can be achieved particularly well.

Working near the boiling point is desirable not only because of the required shrinkage initiation. Working at high temperatures also seems to aid in the removal of any finishing agents present on the fabric. During fiber production, the filament yarns predominantly used for fabric manufacture are subjected to finishing agents that should not remain on the fabric. Over long storage periods, such as are possible for air bags, residues of such finishing agents can serve as breeding grounds for microorganisms. This is very undesirable. In addition to finishing agents, the fabric can contain size, and this must likewise be removed in this treatment.

The wet treatment near the boiling point, however, presents problems with respect to the unavoidable vaporization of the treatment fluid in this temperature range. For this reason, it is appropriate to install a vapor extraction apparatus, not illustrated in FIG. 1, above the treatment vat 6.

Another way to handle the vaporization of the treatment fluid is to cover the treatment vat. In this case, sealing lips must be provided at the fabric entrance and exit points. In addition, the squeezing roller pair near the exit point may be integrated into the cover to preclude expressed bath fluid from accumulating on the cover plate. If the squeezing roller pair cannot be integrated into the cover, another possibility is the installation of a small trap basin for the expressed fluid, which is then fed to either the treatment vat or a drain line.

Figure 3:
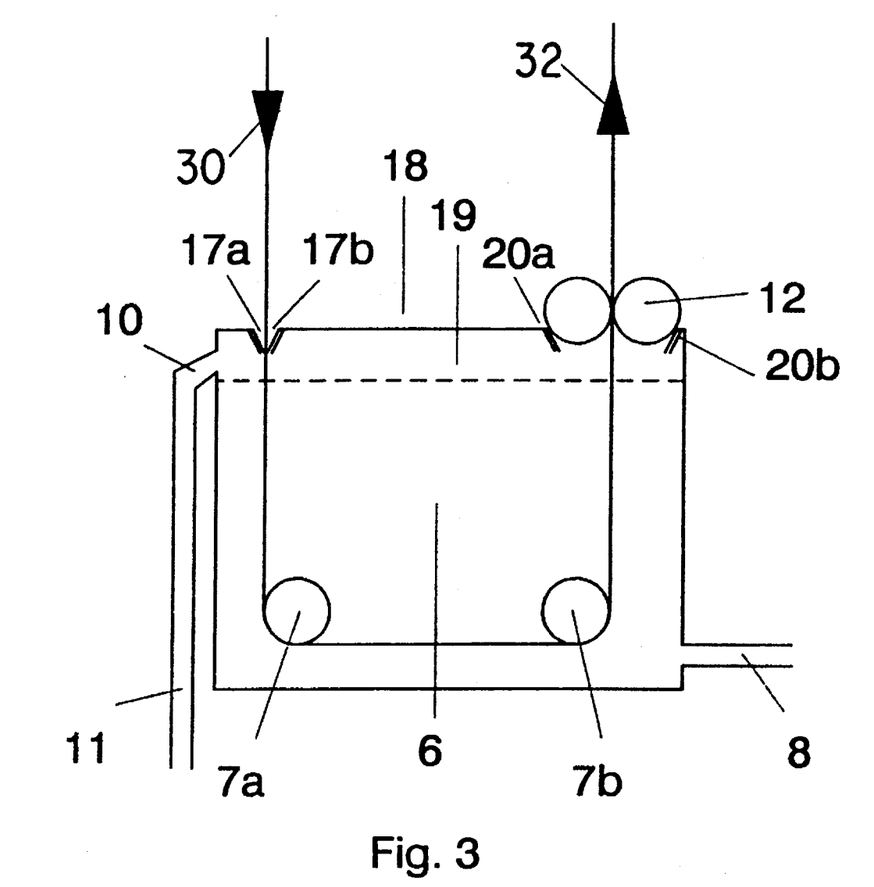
FIG. 3 is a diagram of a vat containing a shrinkage bath according to the present invention.

A treatment vat having a cover is shown in FIG. 3. The direction of fabric travel is indicated by arrows 30 and 32. Fabric is fed via sealing lips 17a and 17b into treatment vat 6. The cover plate 18 is positioned above the maximum bath level 19. After passing through the bath via guide rollers 7a and 7b, the shrunk fabric leaves the treatment bath via squeezing roller pair 12, where it is squeezed. Sealing lip 20a seals off the gap between the left-hand roller and the cover plate and sealing lip 20b seals off the gap between the right-hand roller and the side of the vat 6. Fresh bath fluid is provided via supply line 8. Used fluid is drained off by line 11 via overflow channel 10.

The retention time that the fabric remains in the treatment bath is also important to the amount of shrinkage initiated in the bath. The retention time should be long enough that the fabric attains the temperature of the treatment bath during immersion. The retention time depends on the web speed, i.e., on the weaving speed, the dimensioning of the treatment vat, and the path the fabric travels through the treatment vat. The shape of the treatment vat should therefore be selected such that as long an immersion zone as possible can be implemented.

Slow web speeds established by a power loom are helpful in attaining the desired retention time in most cases. A typical fabric used in the contact portion of an air bar is made with a plain weave from a filament yarn having a titer of 470 dtex and a fiber count of 20/cm. For a weft insertion rate of 300/min, a typical web speed of 15 cm/min may be obtained.

When weaving on a high-performance loom, where the weft insertion rate is 800/min, a web speed of 40 cm/min may be obtained.

The routing of the fabric web through treatment vat 6, as illustrated in FIG. 1 and FIG. 3, represents an example only and should not be considered as restrictive. For example, an additional deflection roller can be located in the vat 6 to lengthen the path of travel and thereby increase the immersion time.

Figure 4:
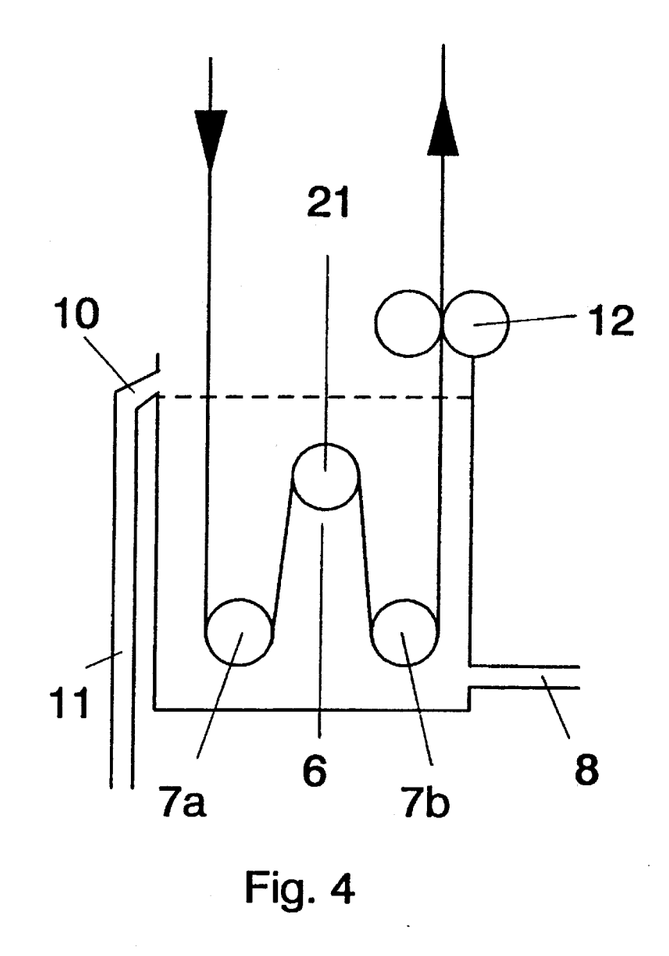
FIG. 4 is a diagram of a vat containing a shrinkage bath according to the present invention.

An alternate routing path for the fabric in the treatment vat 6 is shown in FIG. 4. In this embodiment, the fabric web is first routed down under roller 7a, then up over deflection roller 21, down again via roller 7b, and finally up again to squeezing roller pair 12. Fresh treatment fluid is delivered via supply line 8. Used treatment fluid is drained off by line 11 via overflow channel 10. Instead of one roller, as illustrated by roller 21 in FIG. 4, several rollers can be located in the upper portion of the bath. The lower portion of the bath must then contain a correspondingly greater number of guide rollers.

Travel over several deflection rollers can present problems, however, with respect to the desired shrinkage initiation, since on the one hand problem-free feeding requires a certain tension, while on the other hand shrinkage initiation must not be hindered. Use of an appropriate control apparatus to permit different speeds for the individual deflection rollers makes this type of operation possible.

A further variant is the plaiting-down and routing of the fabric through a treatment bath on a roller bed. Such an arrangement is also well known in textile finishing. In this embodiment, the fabric may move through the treatment bath without any tension, providing good conditions for unrestricted shrinkage. Furthermore, a very high retention time in the bath is achieved.

The shape of the vat need not be limited to the U-shape shown in FIG. 1. For example, V-shaped vats with long side sections may also be employed.

A certain turbulence in the bath is also helpful in ensuring good temperature exchange between the treatment fluid and the fabric. In addition, turbulence may help to remove finishing agents or size from the fabric. Turbulence can be accomplished by subjecting the bath to ultrasound or the use of a vane roller in the bath to promote circulation.

Shrinkage initiation during the wet treatment is influenced considerably by the overfeed with which the web is delivered to the treatment vat. Only by overfeeding is it possible to maintain the desired shrinkage during the wet treatment. The overfeed is the difference in speed between two or more sets of machines controlling the speed of the web. The total overfeed for the embodiment shown in FIG. 1 is the difference in the speeds of the two drive roller pairs 5 and 14 located before and after the treatment vat, respectively. Depending on the other treatment parameters selected, and the degree of shrinkage to be initiated, the overfeed can be between 2 and 12%.

With further reference to FIG. 1, if the speed of roller pair 5 is $v_1$, and the speed of roller pair 14 is $v_5$, the relationship between $v_1$ and $v_5$ is given by the equation $v_5 = v_{1-[(v_1)} (\% \text{shrinkage})]$.

Selection of a suitable overfeed depends on the initial shrinkage of the yarns used in fabric manufacture. For production of contact fabrics for air bags having minimal air permeability from polyamide yarns, it is best to use yarns with a high shrinkage capacity. In this case, the overfeed values to be set for achieving sufficient shrinkage initiation are 6–12%. For production of filter fabrics for air bags made from polyamide yarns, the use of yarns having a lower shrinkage capacity, and overfeed values of 2–5% are sufficient.

When making air bag fabrics from polyester yarns, only slight shrinkage need be initiated in the aqueous bath. In this case, it is sufficient to operate with overfeed values of 2–4%.

In any case, it is advisable to select the desired overfeed through pretrials in order to achieve the necessary shrinkage initiation for the required air permeability while maintaining the tension required for problem-free feeding of the fabric.

Another possibility for a somewhat modified type of operation is offered by implementing the guide rollers 7a and 7b, as shown in FIG. 1, as sieve drums. In this arrangement, the treatment fluid is sucked through the fabric into the sieve drums. The speed of the sieve drums can be regulated via the drive mechanism of the sieve drums since the drums serve as support elements for the fabric. Moreover, this form of operation also supports good bath circulation.

When using sieve drums as the guide elements 7a and 7b, the overfeed can be established between the sieve drums. Sieve drum 7a may run at speed $v_1$ and sieve drum 7b may run at speed $v_5$. The speed of roller pair 5 can likewise be $v_1$.

Alternately, roller pair 5 may be operated at $v_1$, and sieve drum 7a may be operated at $v_2$, where $v_2 < v_1$. In this case, support element 5, shown in FIG. 1 as a roller pair, could be implemented as a deflection roller. Where element 5 is a deflection roller, speed regulation would only be possible between the sieve drums.

It is also possible to operate a sieve drum 7b at the same speed $v_5$ as roller pair 12, or sieve drum 7b may be operated at speed $v_3$ and roller pair 12 at speed $v_4$, where $v_3 > v_4$.

Roller pair 12 not only has the task of squeezing excess bath fluid; it also supports withdrawal roller pair 14. Squeezing roller pair 12 can be fed at speed $v_5$ of drive roller pair 14, but it is practical to further relax the fabric in the drying zone 13. In this case roller pair 12 is operated at speed $v_4$ and drive roller pair 14 at speed $v_5$, where $v_5 < v_4$. Selection of the speed settings depends heavily on the local conditions and the type of fabric to be treated. In any case, however, the relations $v_5 < v_1$ and $v_4 < v_1$ must apply. Concerning the relation of $v_5$ to $v_4$, either $v_5 < v_4$ or $v_5 = v_4$ applies. Usually $v_5$ may only be equal to $v_4$ when the fabric is woven from polyamide fibers. For fabrics composed of polyester fibers, $v_5$ is usually less than $v_4$.

The degree of squeezing to be established at roller pair 12 depends heavily on the web speed and the capacity of the drying zone. A high degree of squeezing, 50% with polyamide fabrics, for example, is desirable for problem-free drying. The degree of squeezing is the weight of the treatment fluid remaining on the fabric after squeezing compared to the weight of the dry fabric, in percent.

After squeezing, the fabric is fed into drying zone 13, where it is dried. During drying, the temperature of industrial fabrics woven from polyamide fibers must not exceed 150° C., to ensure good aging resistance. A favorable drying temperature range is 140°–150° C. Higher drying temperatures can result in thermofixation, coupled with deterioration of the air permeability values and impairment of aging resistance. These temperature specifications are particularly applicable to polyamide fibers.

In carrying out the method according to the invention with other fibers, higher drying temperatures may be used. The drying temperature may be 190° C. for fabric made from polyester fibers. In carrying out the method with fabrics made from polyester fibers, overfeed must be provided between roller pairs 12 and 14, since with this type of fiber only slight shrinkage can be initiated in an aqueous treatment bath. The actual shrinkage initiation in this case takes place in the drying zone. For example, the overfeed between roller pairs 12 and 14 can be 4–10% for air bag contact fabrics made from polyester yarns and 1–4% for filter fabrics made from the same fiber material. In any case, for speed $v_4$ of roller pair 12 and speed $v_5$ of pair 14, the relation $v_5 < v_4$ must apply.

In carrying out the method according to the invention, infrared drying is preferred. Other drying techniques can be used, however.

Due to the vaporization of the treatment fluid that occurs during drying, it is practical to install a vapor extraction apparatus at the exit from the dryer.

After drying, cooling must take place as slowly as possible, preferably without the aid of a fan. Depending on local conditions, the section between the exit from dryer 13 and cloth beam 16 may be insufficient to provide adequate cooling prior to winding the fabric onto cloth beam 16. In this case, it is appropriate to provide a hang-out zone between drive roller pair 14 and deflection roller 15.

When winding the fabric onto cloth beam 16, the tension should preferably be in the range between 150 and 300 N/m of fabric width. Slow cooling and low winding tension is important to achieve good aging resistance.

Aging resistance means substantial invariance of the air permeability values, even during storage under extreme conditions. A method for testing this aging resistance is described in EP-A 523 546.

Preferably, drying occurs continuously and immediately after the wet process since this results in the greatest cost and process efficiency. It is possible, however, to wind the fabric onto a cloth beam while wet and then to dry, whereby any desired drying apparatus can be employed.

If the present invention is used with a water-jet loom, partial shrinkage of the yarns used for fabric manufacture can result from the water used for weft insertion. This shrinkage is normally not sufficient to establish the desired air permeability. Any preshrinkage on the water-jet loom, however, must be taken into account when selecting the overfeed.

The method of the present invention is not limited to the manufacture of final fabrics with the desired final air permeability. The method may be used to achieve a desired amount of pre-shrinkage, with final shrinkage achieved via a conventional manner, such as on a jigger. A suitable method for achieving final shrinkage is described in EP-A 436 950.

Control of the machinery sets being operated at different speeds can be accomplished via individual drive mechanisms and appropriate settings. Depending on the control capabilities existing in a weaving mill, the power loom as well as the drive mechanisms of the individual drive rollers or roller pairs may be centrally controlled via a computer.

During process stoppages, the attendant increase in wet treatment time does not cause problems, whereas the dryer must be shut down. This shutdown is usually not sufficient to effect the desired cooling. It is therefore desirable to provide the drying zone with fold-out infrared heating sections, for example, which can be drawn back during process stoppages.

In applying the method according to the invention, fabrics made from synthetic filament yarns are preferably used. However, the method can also be used in the same manner for fabrics made from spun-fiber yarns. The term fiber is used here as a general term for filament and staple fibers.

The method in accordance with the invention is particularly suitable for fabrics made from polyamide fibers, especially for fabrics made from polyamide 6.6 (polyhexamethylene adipic amide) or polyamide 4.6 (polytetramethylene adipic amide). Other synthetic fibers can be employed for fabrics to which the method of the invention is applied, as long as the fibers possess the shrinkage capacity necessary for carrying out the method and the strength required for industrial fabrics.

Yarn titers of 230–940 dtex have proven well suited for uncoated industrial woven fabrics with low or specifically adjusted air permeability. Particularly for air bags, yarn titers of 235, 350, and 470 dtex are preferably used. The number of individual filaments can be 36 or 72 for a titer of 235 dtex and 72 or 144 for a titer of 350 or 470 dtex. Furthermore, the yarn used for fabric manufacture should have a strength of at least 60 cn/tex and an elongation of 10–30%.

The shrinkage characteristics of the yarns are important. The desired shrinkage value differs depending on the desired air permeability of the fabric to be manufactured. Polyamide yarns to be processed into air bag contact fabrics with very low air permeability require hot-air shrinkage values of 6–10% (measured at 190° C). For polyamide yarns to be processed into filter fabrics for air bags, hot-air shrinkage values of 2–5% (measured at 190° C.) are preferred. The reason yarns having different shrinkage values are used results from different air permeability requirements of contact and filter fabrics. To achieve the low air permeability needed for contact fabrics, a denser fabric and therefore higher shrinkage initiation is required during the wet treatment. The higher shrinkage necessitates a higher initial shrinkage capacity.

The warp yarns used for fabric manufacture are frequently sized prior to weaving. That is, they are sheathed in a polymer material which ensures better processability on the power loom. The size applied to the yarn should be removed when manufacturing industrial fabrics. In the method of the invention, this is accomplished by treatment in the treatment fluid.

Frequently, particularly for cost-related reasons, attempts are made to used unsized yarns. This is required when processing on the water-jet loom, since sized yarns can be processed only with great difficulty in a water-jet loom. Instead of sizing the warp yarns, the warp yarn can be twisted or tangled. Both of these steps are well known in the chemical fiber industry. In carrying out the method of the invention, use of unsized yarns is preferred.

For specific adjustment of air permeability, the fiber count of the warp and weft during weaving must be matched exactly to the yarn titer. For example, when using a polyamide 6.6 yarn with a hot-air shrinkage of 25% (measured at 190° C.), a fiber count of approximately 16/cm in warp and weft in plain weaves, and a titer of 470 dtex, the method of the present invention results in a fabric having an air permeability of about 80 l/dm².min, (as measured at 500 Pa test differential pressure). If the fiber counts for the cited titer are increased to approximately 19/cm in warp and weft, the method of the present invention can be used to produce a fabric having an air permeability of approximately 30 l/dm².min, (as measured at 500 Pa test differential pressure).

If a yarn with the same titer is used for manufacturing fabrics with low air permeability, the yarn must have a hot-air shrinkage of 6–10% (measured at 190° C). With a fiber count of approximately 22/cm in warp and weft, the method of the present invention can be used to produce a fabric having an air permeability of approx. 7 l/dm².min.

For the manufacture of fabrics with low air permeability according to the present invention, i.e., less than 10 l/dm$^2$.min, fiber counts of 26–30/cm for a yarn titer of 235 dtex, 18–28/cm for a yarn titer of 350 dtex, and 18–25/cm for a yarn titer of 470 dtex may be used where the yarns used in each case have a hot-air shrinkage of 6–10% (measured at 190° C). The numbers cited above apply to plain weaves.

For air bag contact fabrics and other industrial woven fabrics having low air permeability, a plain weave with symmetrical weave setting (equal or approximately equal fiber counts in warp and weft) is preferred. For finer titers, a 2 /2 basket weave with symmetrical setting can also be selected. For fabrics with higher air permeability, other weaves such as cross twill or basket weaves can be employed.

The given data concerning fibers and yarns and weave settings are examples only and are not to be considered restrictive.

The given air permeability values in each case were determined in accordance with DIN 53 887. In departing from this test standard, however, a test differential pressure of 500 Pa was selected in order to obtain sufficient test signal even with low air permeability, as is common for air bag contact fabrics.

The cited hot-air shrinkage specifications were determined in accordance with DIN 53 866, Sheet 3.

The method according to the present invention provides the opportunity to manufacture industrial woven fabrics with either very low air permeability, or higher, specifically adjusted air permeability in a simple and cost-effective manner. The method according to the invention is particularly suited to the manufacture of fabrics for use in air bags.

As many apparently different embodiments of this invention may be made without departing from the spirit and scope thereof, it is to be understood that the invention is not limited to the specific embodiments disclosed herein.

What is claimed is:

1. A method of manufacturing an uncoated industrial woven fabric having a specific air permeability, comprising the steps of:

weaving synthetic fiber yarns into an uncoated fabric;

continuously and immediately feeding the fabric at a fabric entry speed into a aqueous treatment bath having a temperature of between approximately 20° C. and approximately 100° C. to immerse the fabric in the bath and to cause the fabric to shrink, the fabric entry speed being substantially equal to a speed at which the fabric exits the weaving apparatus;

withdrawing the fabric from the treatment bath at a predetermined fabric withdrawal speed; and drying the fabric after withdrawal from the treatment bath.

2. The method of claim 1, wherein the step of weaving comprises weaving the fabric on a power loom.

3. The method of claim 1, wherein said temperature is between approximately 60° C. and approximately 100° C.

4. The method of claim 1, wherein said temperature is between approximately 90° C. and approximately 95° C.

5. The method of claim 1, wherein said temperature is between approximately 20° C. and approximately 60° C.

6. The method of claim 1, wherein the step of feeding comprises feeding the fabric by a first roller pair operating at the fabric entry, speed and withdrawing the fabric from the treatment bath by a second roller pair operating at the fabric withdrawal speed, and wherein the fabric withdrawal speed is between approximately 2 and 12 percent slower than the fabric entry speed.

7. The method of claim 1, wherein the step of drying the fabric continuously follows the step of withdrawing the fabric from the treatment bath.

8. The method of claim 1, wherein the fabric is woven on a water-jet loom and wherein a first part of a total shrinkage of the fabric that occurs during manufacture occurs during the weaving step, and wherein a second part of the total shrinkage occurs during the step of feeding the fabric into the treatment bath.

9. The method of claim 8, wherein a third part of the total shrinkage of the fabric that occurs during manufacture occurs during the drying step.

10. The method of claim 1, wherein the air permeability of the resulting woven fabric is less than approximately 20 l/dm$^2$.min, as measured at a test differential pressure of 500 Pa.

11. The method of claim 1, wherein the air permeability of the resulting woven fabric is less than approximately 10 l/dm$^2$.min, as measured at a test differential pressure of 500 Pa.

12. The method of claim 1, wherein the air permeability of the resulting woven fabric is between approximately 20 l/dm$^2$.min and 120 l/dm$^2$.min, as measured at a test differential pressure of 500 Pa.

13. The method of claim 1, wherein the fabric is a contact fabric for an air bag.

14. The method of claim 1, wherein the fabric is a filter fabric for an air bag.

15. A method of manufacturing a continuous woven fabric having a specific air permeability from shrinkable synthetic fiber yarns, comprising the steps of:

weaving shrinkable synthetic fiber yarns into a continuous fabric using a power loom;

feeding the fabric at a fabric entry speed into a treatment fluid in a treatment vat immediately after the fabric leaves the power loom so that the fabric is immersed in the treatment fluid, the immersion causing the fabric to shrink and to absorb a portion of the treatment fluids wherein the fabric entry speed is substantially equal to a speed at which the fabric exits the power loom;

withdrawing the fabric from the treatment fluid at a predetermined fabric withdrawal speed;

feeding the fabric into a dryer after the fabric is withdrawn from the treatment fluid, the dryer removing at least a portion of the treatment fluid from the fabric; and withdrawing the fabric from the dryer.

16. The method of claim 15, further comprising the step of:

controlling the temperature of the treatment fluid to control the air permeability of the resulting fabric.

17. The method of claim 15 wherein the fabric entry speed exceeds the fabric withdrawal speed so that the fabric shrinks while immersed in the treatment fluid.

18. The method of claim 17, further comprising the step of:

controlling the fabric entry speed and the fabric withdrawal speed to control the air permeability of the resulting fabric.

19. The method of claim 15 further comprising the step of:

passing the fabric through squeezing rollers after withdrawing the fabric from the treatment fluid and before feeding the fabric into the dryer.

20. The method of claim 15, wherein the step of drying causes the fabric to shrink.

21. The method of claim 20, wherein the fabric is fed into the dryer at a rate that is greater than the rate that the fabric is withdrawn from the dryer so that the fabric may shrink while passing through the dryer.

22. The method of claim 21, further comprising the step of:

controlling the rates that the fabric is fed into and withdrawn from the dryer to control the air permeability of the resulting fabric.

23. The method of claim 21, wherein the fabric entry speed exceeds the fabric withdrawal speed so that the fabric shrinks while immersed in the treatment fluid.

24. The method of claim 23, further comprising the step of:

controlling the temperature of the treatment fluid, the fabric entry speed and the fabric withdrawal speed, and the rates that the fabric is fed into and withdrawn from the dryer to control the air permeability of the resulting fabric.

25. A method of manufacturing an uncoated industrial woven fabric having a specific air permeability, comprising the steps of:

weaving synthetic fiber yarns into an uncoated fabric with a weaving apparatus;

continuously and immediately feeding the fabric at a fabric entry speed into an aqueous treatment bath having a temperature between approximately 20° C. and approximately 100° C. to immerse the fabric in the bath and to cause the fabric to shrink, the fabric entry speed being substantially equal to a speed at which the fabric exits the weaving apparatus;

withdrawing the fabric from the treatment bath at a fabric withdrawal speed, wherein the fabric entry speed is between approximately 2 and 12 percent greater than the fabric withdrawal speed; and drying the fabric after withdrawal from the treatment bath.

* * * * *

UNITED STATES PATENT AND TRADEMARK OFFICE
CERTIFICATE OF CORRECTION

PATENT NO. : 5,477,890

DATED : December 26, 1995

INVENTOR(S) : Wolf R. KRUMMHEUER et al.

It is certified that error appears in the above-indentified patent and that said Letters Patent is hereby corrected as shown below:

IN THE ABSTRACT:
    Line 5, change "C.," to --C,--.

IN THE SPECIFICATION:
    Column 3, line 55, change "C." (second occurrence) to --C--;
                line 56, change "C." to --C--.
    Column 4, line 7, change "C." to --C--.
    Column 6, line 56, change "C.," to --C,--;
                line 64, change "C." to --C--.
    Column 8, line 25, change "C.)" to --C)--;
                line 52, change "25%" to --2-5%--;
                line 53, change "C.)," to --C),--.
    Column 9, line 42, after "fabric" insert --with a weaving apparatus--;
                lines 46 and 47, change "C." to --C--.

UNITED STATES PATENT AND TRADEMARK OFFICE
CERTIFICATE OF CORRECTION

PATENT NO. : 5,477,890
DATED : December 26, 1995
INVENTOR(S) : Wolf R. Krummheuer et al.

It is certified that error appears in the above-indentified patent and that said Letters Patent is hereby corrected as shown below:

Column 9, line 57, change "C." (first occurrence) to --C--.

Column 9, line 59, change "C." (first occurrence) to --C--.

Column 9, line 61, change "C." (first occurrence) to --C--.

Column 12, lines 5 and 6, change "C." to --C--.

Signed and Sealed this

Twenty-sixth Day of March, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,477,890
DATED : December 26, 1995
INVENTOR(S) : Wolf R. KRUMMHEUER et al.

It is certified that error appears in the above-indentified patent and that said Letters Patent is hereby corrected as shown below:

Column 9, line 42, after "fabric" insert --with a weaving apparatus--;

line 45, change "a" to --an--; and
lines 46 and 47, change "C." to --C--.

Signed and Sealed this

Fourteenth Day of May, 1996

Attest:

BRUCE LEHMAN

*Attesting Officer*     *Commissioner of Patents and Trademarks*